J. BANCROFT.
Hand-Motor for Sewing-Machine.
No. 216,496. Patented June 17, 1879.
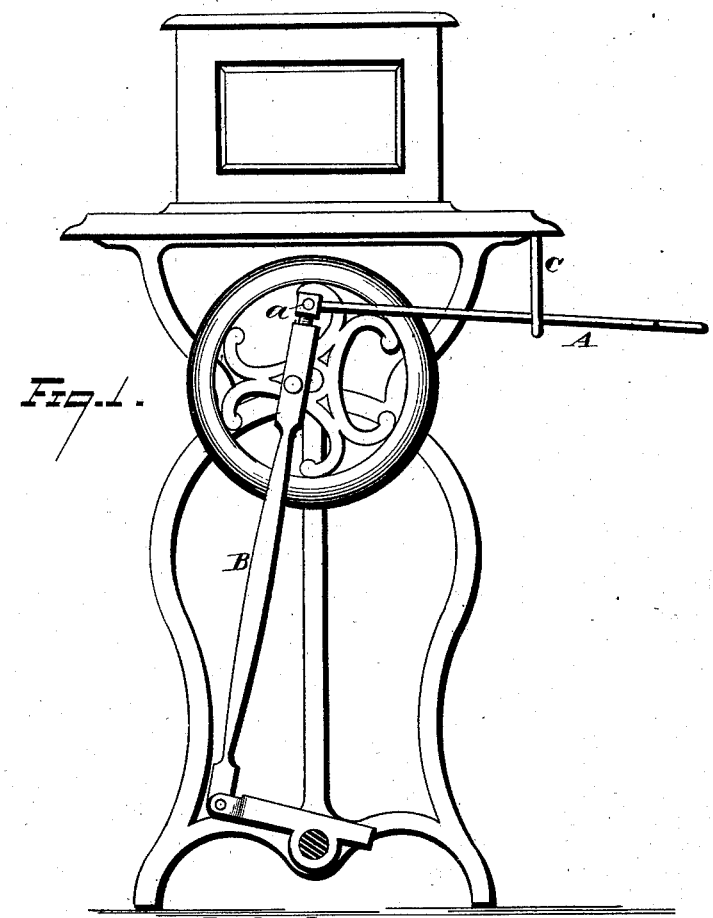
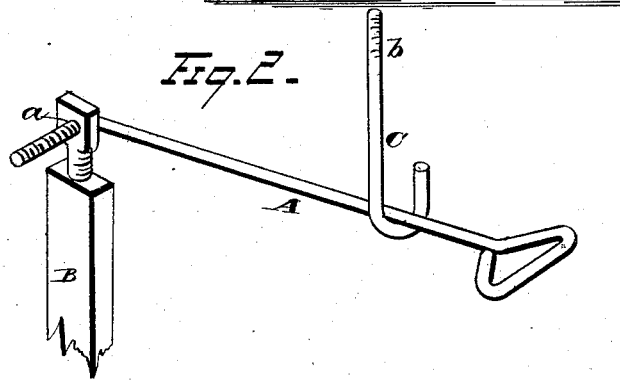
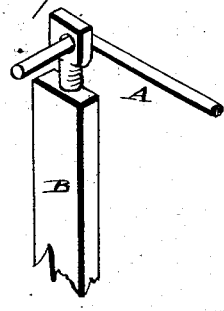
WITNESSES:
INVENTOR:
James Bancroft.
By Leggett & Leggett.
ATTORNEYS.

UNITED STATES PATENT OFFICE.

JAMES BANCROFT, OF ATHENS, GEORGIA.

IMPROVEMENT IN HAND-MOTORS FOR SEWING-MACHINES.

Specification forming part of Letters Patent No. 216,496, dated June 17, 1879; application filed May 13, 1879.

*To all whom it may concern:*

Be it known that I, JAMES BANCROFT, of Athens, in the county of Clarke and State of Georgia, have invented certain new and useful Improvements in Hand-Motors for Sewing-Machines; and I do hereby declare the following to be a full, clear, and exact description of the invention, such as will enable others skilled in the art to which it pertains to make and use it, reference being had to the accompanying drawings, which form part of this specification.

My invention relates to sewing-machine motors, and is designed to provide a simple form of actuating means, whereby a sewing-machine may be easily and effectively operated by the hand.

The invention consists in perforating the upper extremity of the treadle-pitman, and engaging therewith a horizontal handle which projects outward from beneath the machine-table, so as to be readily operated, said handle having a hook on its inner extremity, which engages with the eye of the pitman, while it is supported in position during its horizontal reciprocation by a loop which is suspended from the machine-table.

In the drawings, Figure 1 is a view in side elevation, representing the invention. Fig. 2 is a detached view of the same. Fig. 3 is a modification view.

The handle A may be made of any suitable material, and preferably I use a wire rod. Its extremity is made in form of a hook adapted to have screw-thread engagement with a corresponding eye, $a$, formed in the upper extremity of the treadle-pitman B of any sewing-machine.

A loop, C, depends from the machine-table in position to permit the outer extremity of the handle to be supported therein as the latter is moved to and fro in endwise movement. This loop may be made of any material, and suspended as desired; but, preferably, I use a cord or wire, and fasten the same by a screw eye or hook, $b$, secured to the under side of the table near its front edge.

The handle is of length sufficient to project out beyond the table's edge, and be worked by the operator in horizontal reciprocation.

A hand-motor of this character is found to be extremely simple, both in its construction and operation, and to admirably answer the purpose of my invention, as previously stated.

In the modification view it will be observed that the hook of the handle is made plain, without a screw-thread, and that it fits in the hole (also made without a screw-thread) formed in the upper extremity of the pitman.

Having fully described my invention, what I claim as new, and desire to secure by Letters Patent, is—

In a sewing-machine, the combination, with the pitman, whose upper extremity is provided with an eye, of the horizontal handle having a hook which engages therewith, and the loop depending from the machine-table, in which said handle works, substantially as set forth.

In testimony that I claim the foregoing I have hereunto set my hand this 29th day of April, 1879.

JAMES BANCROFT.

Witnesses:
 JOSEPH BIRD,
 R. S. HAYWARD.